United States Patent Office 3,201,450
Patented Aug. 17, 1965

3,201,450
PREPARATION OF SOLID REACTION PRODUCTS OF NITRILES AND DECABORANE
Murray S. Cohen, Convent Station, and Marvin M. Fein, Westfield, N.J., assignors, by mesne assignments, to Thiokol Chemical Corporation, a corporation of Delaware
No Drawing. Filed Oct. 15, 1957, Ser. No. 690,407
15 Claims. (Cl. 260—465.1)

This application is a continuation-in-part of our co-pending application Serial No. 660,986, filed May 22, 1957, now abandoned.

This invention relates to solid reaction products of nitriles and boranes.

The solid products of this invention when incorporated with suitable oxidizers such as ammonium perchlorate, potassium perchlorate, sodium perchlorate, ammonium nitrate and etc., yield solid propellants suitable for rocket power plants and other jet propelled devices. Such propellants burn with high flame speeds, have high heats of combustion and are of the high specific impulse type. Probably the single most important factor in determining the performance of a propellant charge is the specific impulse, and appreciable increases in performance will result in the use of the higher specific impulse material. The products of this invention when incorporated with oxidizers are capable of being formed into a wide variety of grains, tablets, and shapes, all with desirable mechanical and chemical properties. Propellants produced by the methods described in this application burn uniformly without distintegration when ignited by conventional means, such as pyrotechnic type igniter and are mechanically strong enough to withstand ordinary handling.

The solid reaction products of this invention are prepared by reacting a nitrile of an aliphatic mono- or di-carboxylic acid having from 1 to 6 carbon atoms with a suitable borane.

Suitable nitriles include hydrogen cyanide, acetonitrile, propionitrile, butyronitrile, isobutyronitrile, dimethylpropionitrile, valeronitrile, acrylonitrile, 3-butenenitrile, 4-pentenenitrile, succinonitrile, maleonitrile, adiponitrile, and B,B'-oxydipropionitrile. The nitriles can be monomeric or polymeric.

Suitable boranes include tetraborane, pentaborane, decaborane, lower alkyl pentaboranes in which the alkyl groups contain 1 to 5 carbon atoms, and lower alkyl decaboranes in which the alkyl groups contain 1 to 5 carbon atoms. Lower alkyl pentaboranes can be prepared, for example, according to the method described in application Serial No. 540,142, now U.S. Patent 3,052,-725, filed October 12, 1955, of Altwicker et al. Lower alkyl decaboranes can be prepared, for example, according to the method described in application Serial No. 540,141, now U.S. Patent 3,109,030, filed October 12, 1955, of Altwicker et al.

The ratio of reactants can be varied widely, generally being in the range from 0.01 to 14 moles of nitrile per mole of borane, preferably 1 to 5:1. The reaction temperature can vary from 0° to 180° C. and the pressure can vary from 0.002 mm. of mercury to several atomspheres, although subatmospheric pressures are preferred. The reaction is a substitution reaction and the degree of completeness of the reaction can be determined by the rate and quantity of hydrogen. Also the rate at which solid products form and precipitate from the solution indicates the degree of completion of the reaction. The reaction to go to completion generally requires about 3 to 30 hours depending upon the ratio of reactants, the particular nitrile utilized, and the temperature and pressure employed.

Although the reaction will proceed in the absence of a solvent, best results are obtained, especially where solid reactants are employed, by carrying out the reaction in a solvent common for the reactants but inert with respect to the reactants. Such solvents include aliphatic hydrocarbon solvents such as n-pentane, hexane and heptane, aromatic hydrocarbon solvents such as benzene, toluene and xylene, cycloaliphatic solvents such as cyclohexane and methylcyclopentane and oxygenated organic solvents such as dioxane, ethyl acetate, and diisopropyl ether. The amount of solvent can vary widely but is generally within the range of about 1 to 100 moles per mole of each reactant. When a solvent is employed, it is preferred to carry out the reaction at the reflux temperature of the solvent.

The process of the invention is illustrated in detail by the following examples which are to be considered not limitative.

Example I

A 300 ml. three-necked glass flask was equipped with a magnetic stirrer, thermometer, dropping funnel with a bypass and a reflux condenser having a drying tube leading to a wet test meter which monitored gas evolution. This flask was charged with 20.5 g. of acetonitrile (0.5 mole) and 50 ml. of benzene. To this mixture, through the dropping funnel, was added over a 15 minute period a solution of 12.2 g. of decaborane in 75 ml. of benzene. The stirrer was then started, the reaction mixture was heated to reflux (approximately 81° C.) and gas evolution was monitored. After 22 hours of heating, gas evolution had ceased and was found to be equivalent of 0.1 mole of hydrogen gas. When the stirrer and heating were stopped it was observed that the reaction product in the flask was a white powder. The reaction product was separated by filtration, and found to weigh 14.7 grams. Wet analysis of the white powder indicated that it contained 52.3 percent boron and 11.3 percent nitrogen. Infrared spectrophotometric analysis indicated a diacetonitrile-decaborane derivative of the formula

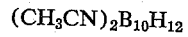

$$(CH_3CN)_2B_{10}H_{12}$$

Example II

To a 300 ml. three-necked flask equipped with a magnetic stirrer, thermometer and dropping funnel with a bypass and water cooled reflux condenser was added 12.2 g. of decaborane dissolved in 110 ml. of benzene. To this was added over a period of 3 minutes, 12.8 g. of B,B'-oxydipropinonitrile in 50 ml. of benzene. The gas, which started to evolve immediately, passed through the bypass and through a drying tube leading to a wet test meter where it was monitored. The reaction mixture was stirred and heated to reflux (about 81° C.) The reaction proceeded for about 1½ hours and an oil formed. After an additional 7 hours, a yellow-orange solid formed. After 21 hours at reflux, gas evolution was slow. The gas evolved was equivalent to 0.64 mole per 1 mole of decaborane. A yellow-orange solid which has formed in the flask was separated by filtration and found to weigh 17.0 grams. This product was analyzed by wet chemical methods which indicated that it contained 28.9 percent boron and 8.5 percent nitrogen. Infrared spectrophotometric analysis indicated a B,B'-oxydipropionitrile-decaborane derivative.

Example III

A 1000 ml. three-necked glass flask was equipped with a magnetic stirrer, thermometer, dropping funnel with a bypass, and a reflux condenser having a drying tube leading to a wet test meter which monitored gas evolution. The flask was charged with 13.3 g. of acrylonitrile and 6.1 g. of decaborane in 600 ml. of dry benzene. This was stirred, heated to reflux (about 81° C.) and maintained at that temperature for 7 hours. At this time it was noted that a brown solid had formed in the flask. The flask was cooled, the stirrer stopped, and the brown solid, separated by filtration, was found to weigh 1.4 g. The product would not melt but burned readily with a green flame. Wet chemical analysis indicated the product contained 12.26 percent (compared with the calculated value of 12.3 percent) nitrogen. Infrared analysis showed the presence of an acrylonitrile-decaborane derivative of the formula $C_6H_{20}N_2B_{10}$.

The boron contained solid materials produced by practicing the methods of this invention, can be employed as ingredients of solid propellant compositions in accordance with general procedures which are well understood in the art, inasmuch as the solids produced are readily oxidized using conventional solid oxidizers such as ammonium perchlorate, potassium perchlorate, sodium perchlorate and the like. In formulating a solid propellant composition employing one of the materials produced in accordance with the present invention, generally from 5 to 35 parts by weight of boron containing material and from 65 to 95 by weight of oxidizer are present in the final propellant composition. In the propellant, the oxidizer and the product of the present process are formulated in intimate admixture with each other, as by finely dividing each of the materials separately and thereafter intimately mixing them. The purpose of doing this, as the art is well aware, is to provide proper burning characteristics of the final propellant. In addition to the oxidizer and the oxidizable material, the final propellant can also contain an artificial resin generally of the urea-formaldehyde or phenol-formaldehyde type, the function of the resin being to give the propellant mechanical strength and at the same time improve its burning characteristics. Thus, in manufacturing a suitable propellant, proper proportions of finely divided oxidizer and finely divided boron containing material can be admixed with a high solids content solution of partially condensed urea-formaldehyde or phenol-formaldehyde resin, the proportions being such that the amount of resin is about 5 to 10 percent by weight based on the weight of oxidizer and boron compound. The ingredients are thoroughly mixed with the simultaneous removal of solvent, and following this the solvent free mixture is molded into the desired shape, as by extrusion. Thereafter the resin can be cured by resorting to heating at moderate temperatures. For further information concerning the formulation of solid propellant compositions, a reference is made to U.S. Patent 2,622,277 to Bonnell and U.S. Patent 2,646,596 to Thomas.

We claim:

1. A process for preparing solid reaction products of nitriles and decaborane comprising reacting from 0.01 to 14 moles of a nitrile selected from the group consisting of acetonitrile, propionitrile, butyronitrile, isobutyronitrile, dimethylpropionitrile, valeronitrile, acrylonitrile, 3-butenenitrile, 4-pentenenitrile, succinonitrile, maleonitrile, adiponitrile, and B,B'-oxydipropionitrile, per mole of decaborane.

2. A process for preparing solid reaction products of nitriles and decaborane comprising reacting from 0.01 to 14 moles of the nitrile per mole of decaborane at a temperature of 0 to 180° C. in the presence of a solvent inert with respect to the reactants, the nitrile being selected from the group consisting of acetonitrile, propionitrile, butyronitrile, isobutyronitrile, dimethylpropionitrile, valeronitrile, acrylonitrile, 3-butenenitrile, 4-pentenenitrile, succinonitrile, maleonitrile, adiponitrile, and B,B'-oxydipropionitrile.

3. The process of claim 2 wherein the nitrile is acetonitrile.

4. The process of claim 2 wherein the nitrile is propionitrile.

5. The process of claim 2 wherein the nitrile is acrylonitrile.

6. The process of claim 2 wherein the nitrile is succinonitrile.

7. The process of claim 2 wherein the nitrile is adiponitrile.

8. The process of claim 2 wherein the nitrile is B,B'-oxydipropionitrile.

9. A process for preparing solid reaction products of nitriles and decaborane which comprises reacting from 1 to 5 moles of the nitrile per mole of decaborane for from about 5 to 30 hours in the presence of benzene at a temperature of about 20–85° C., the nitrile being selected from the group consisting of acetonitrile, propionitrile, butyronitrile, isobutyronitrile, dimethylpropionitrile, valeronitrile, acrylonitrile, 3-butenenitrile, 4-pentenenitrile, succinonitrile, maleonitrile, adiponitrile, and B,B'-oxydipropionitrile.

10. The process of claim 9 in which the nitrile is acetonitrile.

11. The process of claim 9 in which the nitrile is acrylonitrile.

12. The process of claim 9 in which the nitrile is B,B'-oxydipropionitrile.

13. The product produced by the process of claim 10.

14. The product produced by the process of claim 11.

15. The product produced by the process of claim 12.

References Cited by the Examiner

Schechter et al.: "Boron Hydrides and Related Compounds," Callery Chem. Co., March 1951, declassified Jan. 5, 1954, page 37.

CHARLES B. PARKER, *Primary Examiner.*

LEON D. ROSDOL, *Examiner.*